United States Patent [19]

Koch

[11] Patent Number: 5,311,993
[45] Date of Patent: May 17, 1994

[54] MULTI-MEDIA TRAY HAVING UNI-DIRECTIONAL PARTITION MEMBERS

[75] Inventor: Richard C. Koch, Trabuco Canyon, Calif.

[73] Assignee: Fellowes Manufacturing Company, Itasca, Ill.

[21] Appl. No.: 955,113

[22] Filed: Oct. 1, 1992

[51] Int. Cl.⁵ .............................................. B65D 85/00
[52] U.S. Cl. .................... 206/425; 206/444; 206/561; 206/508; 220/532; 220/533
[58] Field of Search ............... 206/387, 425, 444, 561, 206/508; 220/529, 532, 533

[56] References Cited

U.S. PATENT DOCUMENTS

| | | | |
|---|---|---|---|
| D. 160,015 | 9/1950 | Rauch et al. . | |
| 2,101,378 | 12/1939 | Wiskoff | 220/532 |
| 2,238,451 | 4/1941 | Roth . | |
| 2,281,845 | 5/1942 | Kaplan . | |
| 2,297,081 | 9/1942 | Slough . | |
| 2,304,007 | 12/1942 | Mendelson . | |
| 2,346,705 | 4/1944 | Sabin . | |
| 2,682,966 | 7/1954 | Wiepert | 206/561 |
| 3,129,838 | 4/1964 | Wormer, III | 220/533 |
| 3,353,704 | 11/1967 | Belcher et al. | 220/533 |
| 3,807,572 | 4/1974 | Luvara et al. . | |
| 4,126,229 | 11/1978 | Sheres . | |
| 4,128,175 | 12/1978 | Schweizer . | |
| 4,396,123 | 8/1983 | Swan . | |
| 4,453,785 | 6/1984 | Smith . | |
| 4,511,194 | 4/1985 | Park et al. . | |
| 4,544,213 | 10/1985 | Long et al. . | |
| 4,600,110 | 7/1986 | Timor . | |
| 4,629,067 | 12/1986 | Pavlik et al. . | |
| 4,640,416 | 2/1987 | Northrup et al. | 206/425 |
| 4,684,027 | 8/1987 | Wright . | |
| 4,712,679 | 12/1987 | Lowe . | |
| 4,743,156 | 5/1988 | Raffay et al. . | |
| 4,779,730 | 10/1988 | Hartsfield et al. . | |
| 4,828,133 | 5/1989 | Hougendobler | 206/44 R |
| 4,848,574 | 7/1989 | Murphy et al. | 206/444 |
| 4,875,743 | 10/1989 | Gelardi et al. . | |
| 4,884,692 | 12/1989 | Middlebrooks | 206/444 |
| 4,889,244 | 12/1989 | Hehn et al. . | |
| 4,909,384 | 3/1990 | About | 206/561 |
| 4,949,853 | 8/1990 | Klein et al. . | |
| 4,966,278 | 10/1990 | Rosi et al. . | |

OTHER PUBLICATIONS

1991 Office Products Catalog from City Office Supply Corp., Copyrighted 1990, pp. 467–478.
May–Jun. 1991 MISCO ® Catalog, center tear-out page.
A photostatic copy of three pictures of the inside of a multibox purchased from MISCO sometime in 1992.
Visible Supply Computer Supply Corporation catalog, p. 45, 1991 for a tray from Innovative Concepts along with a Promotional Bulletin from Innovative Concepts, 1991.
Label from MEMOREX ® Universal Storage System, 1992.
A portion of an Oct. 1992 GLOBAL ® catalog, pp. 17–20.

*Primary Examiner*—David T. Fidei
*Attorney, Agent, or Firm*—Willian Brinks Hofer Gilson & Lione

[57] ABSTRACT

A multi-media storage tray with at least one uni-directional partition member provided to store and organize different combinations of media. The bottom of the try is provided with a plurality of positioning slots each surrounded by detents having substantially the same shape as the partition members. The partition members will fit in the detents only when the partitions are oriented in a single direction.

14 Claims, 5 Drawing Sheets

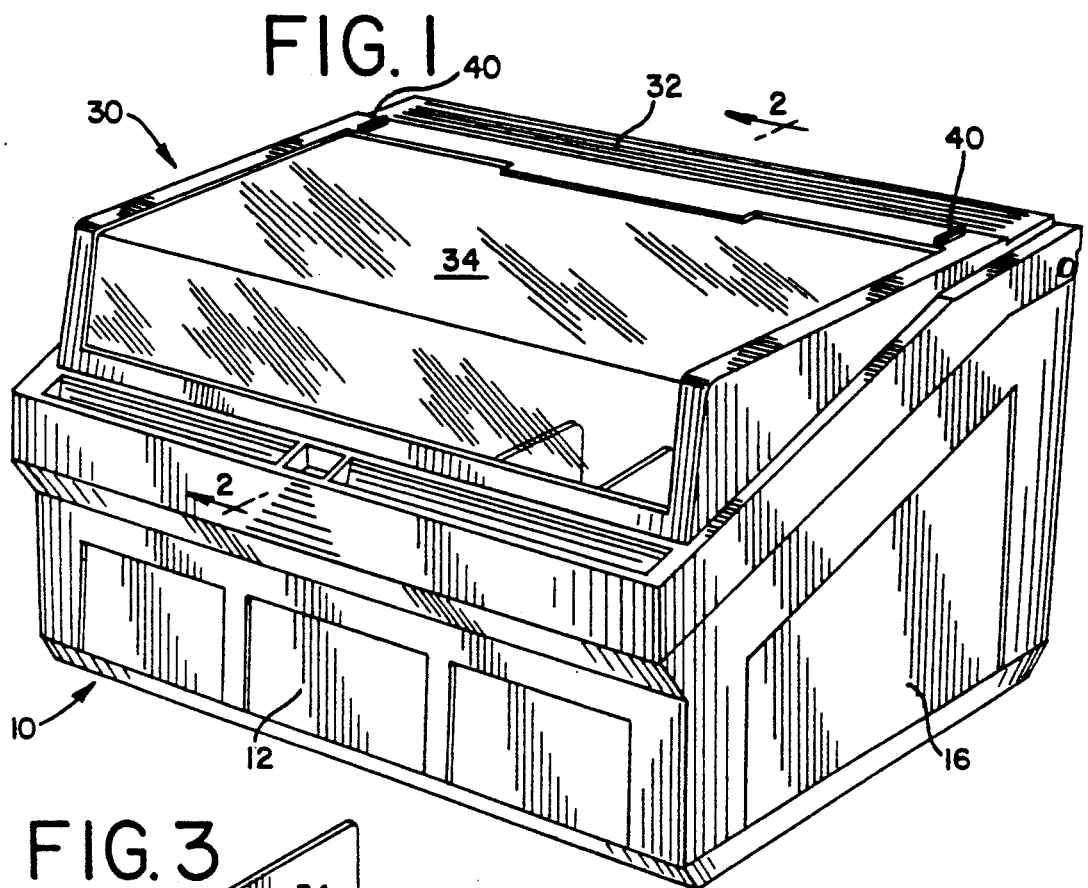
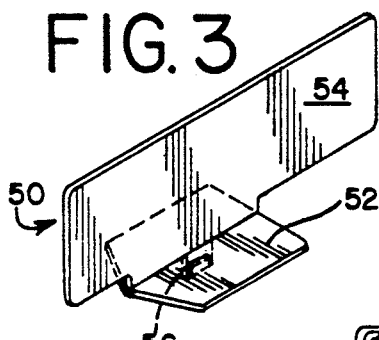
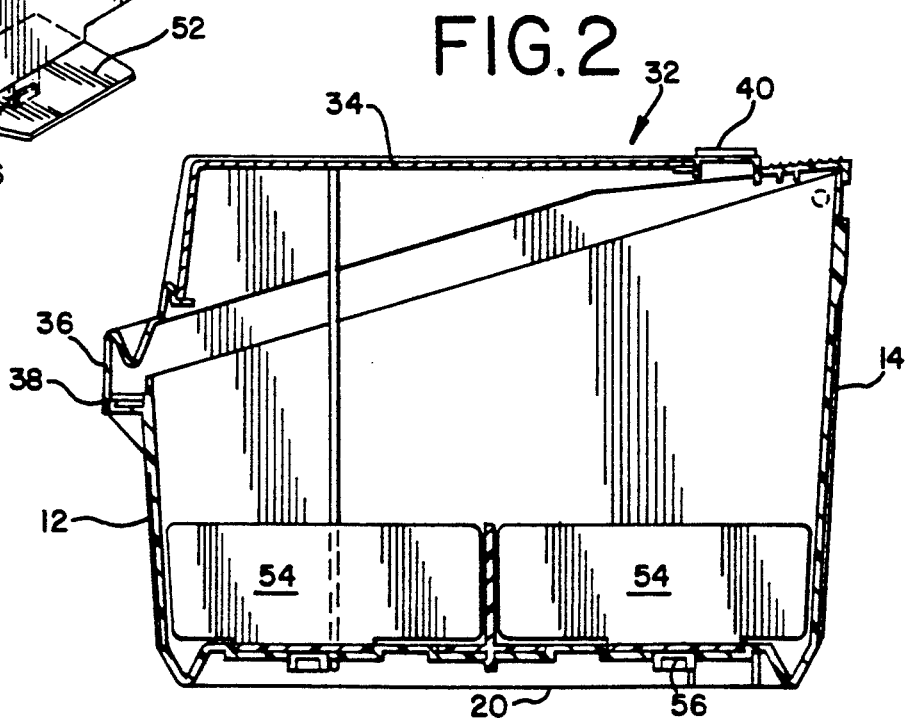

MULTI-MEDIA TRAY HAVING UNI-DIRECTIONAL PARTITION MEMBERS

BACKGROUND OF THE INVENTION

The present invention relates to a multi-media tray or container useful for storing and organizing different types of media material, preferably, media for use with computers. At the present, there exists several types of commonly used media material for use at home and at the office, particularly with personal computers. For example, the following types of media are prevalent: 5¼ inch computer diskettes also known as "floppy disks," mini data cartridges, CD-ROM optical disks and compact disks which can be stored in a container that is slightly wider and thicker than a floppy disk, 3½ inch computer diskettes, data cartridges and VHS tapes. The designation of each computer diskette relates to its width.

Due to the growing trend of small businesses and home offices, there exists a need for storage trays that can accommodate a wide variety of media material within a single storage tray. For example, some computers presently available may require 5¼ inch computer diskettes, 3½ inch computer diskettes, and magnetic tape cartridges. Accordingly, there is a need for a tray that is able to store and organize these different types of media, among others. In addition, such trays should also have the capability of being vertically stacked so that the trays themselves can be organized.

Trays that are capable of storing and organizing different types of media exist. At least some of these trays have dividers or partition members to divide the trays into sections. A particular problem with these trays is that the placement of the partition members is confusing for the consumer leading to frustration and dissatisfaction with the tray. The multi-media tray of the present invention solves this problem by providing uni-directional partition members. Thus, a multi-media tray is provided that is simple and easy to assemble and use by the consumer.

SUMMARY OF THE INVENTION

The present invention provides a multi-media tray that can be sectioned by using uni-directional partitions. The multi-media tray comprises a bottom and four upwardly extending walls including a front wall, a rear wall spaced from and substantially parallel to the front wall, a first side wall at a substantially right angle to the front wall, and a second side wall spaced from and substantially parallel to the first side wall.

In one embodiment, the bottom is provided with a plurality of positioning slots. At least one uni-directional partition member is provided and is adapted to removably engage a positioning slot such that the partition is oriented in a single direction to section the tray. Preferably, the positioning slots are strategically located so that when one or more partitions removably engage some of the slots, the tray is advantageously sectioned to accommodate a variety of media within the tray or to better organize like media placed within the tray.

Preferably, a detent is provided that surrounds the slots and has the same shape as the partition. Most preferably, the shape of the detent and the partition are such that the partition can only conform with the detent when the partition is oriented in a single specific direction. In addition, the detent preferably has a depth such that when the detent receives the partition, the top surface of the partition is flush with the inside surface of the bottom.

The uni-directional partition preferably has a flat substantially horizontal top surface with a longitudinal wall extending substantially vertically upward from the top surface. The wall extends along the approximate center longitudinal line, preferably, along at least the entire length of the partition. In addition, the partition is preferably provided with a depending tab on its underside to removably engage the positioning slot.

In an alternative embodiment, the bottom may be provided with a plurality of detents in the shape of the partition members. In this embodiment, the positioning slots are not provided. The detents and partitions preferably have a shape such that the partition is oriented in specific direction to fit in the detent. For example, the partition may have a pentagonal shape with one end having two right angles and the other end having an outwardly pointing triangle shape. The detents are preferably located so that when one or more partitions removably engage the detents, the tray is advantageously sectioned to accommodate a variety of media placed within the tray.

In another embodiment, the bottom is provided with a plurality of positioning slots but the detents are not provided. In this embodiment, the partition member may be substantially vertical with a depending tab or leg provided to removably engage the positioning slots. Preferably, the tab is provided closer to one end of the partition member than the other end. By providing the tab in this location and by locating the positioning slots, the partition members may be oriented in only a single direction within the tray. For example, by locating at least some of the slots near the front wall and by providing the tab closer to one end of the partition, the partition can only removably engage the slot when the partition is oriented in a specific direction.

In a preferred embodiment, the bottom of the tray is provided with at least one column of spaced apart index slots that are adapted to removably engage index dividers. The index dividers can be used to divide and identify media placed in the tray. For example, the dividers may contain writing or be adapted to receive labels and the like to identify media adjacent to the index divider.

In another embodiment, the bottom of the tray is provided with at least one column of spaced apart ridges with adjacent ridges defining an area to receive and position media. At least some of the slots may be located in the area between two adjacent ridges.

In one preferred embodiment, the multi-media tray of the present invention is provided with a cover hinged to the rear wall of the tray. In this embodiment, the trays are vertically stackable. The cover has an upstanding member provided on its top surface that will positively mate with a downstanding member provided on the underside of the bottom of the tray so that the trays are secured from movement relative to each other.

In the most preferred embodiment of the present invention, the multi-media tray comprises a bottom having a plurality of positioning slots with each slot surrounded by a detent, four upwardly extending walls including a front wall, a rear wall spaced from and substantially parallel to the front wall, a first side wall at a substantially right angle to the front wall, and a second side wall spaced from and substantially parallel to the first side wall, and at least one uni-directional partition member adapted to removably engage the positioning slots.

The partition members are pentagonally shaped with the rear end having two right angles and the front end being shaped as an outwardly pointing triangle. The detents have a shape substantially similar to the partition member and a depth such that when the partition removably engages the detent the top surface of the partition is flush with the inside surface of the bottom. The partition is adapted to conform with the detent so that the partition is oriented in a single direction to section the tray. In order to more securely engage the partition, a depending tab is provided on the underside of the partition to removably engage a positioning slot.

The partition member preferably has a flat substantially horizontal top surface with a longitudinal wall extending substantially vertically upward from the top surface and along the approximate center longitudinal line. The longitudinal wall extends at least the entire length of the partition. In the most preferred embodiment, the wall extends beyond the ends of the partition so that the length of the wall extending beyond the rear end of the partition is greater than the length of the wall extending beyond the front end. Accordingly, when two or more partitions are positioned so that each of their longitudinal walls lie in the same plane, a substantially continuous wall is provided to section the tray to organize a variety of media.

In this most preferred embodiment, three rows of positioning slots are provided and lie in a plane parallel to the plane of the front wall. Each row has three positioning slots. A first row of three slots is located near the rear wall, a second row of three slots is located near the front wall with the slots in the second row lying in the same plane as the slots in the first row (i.e., parallel to the first side wall), and a third row of three slots is located along the approximate center longitudinal line of the bottom. By providing this arrangement of positioning slots, two or more partitions can be strategically placed to section the tray and to provide for substantially continuous walls so that varying types of media can be stored and organized within the tray.

Most preferably, at least one column of index slots is provided on the bottom to removably engage index dividers. In addition, at least one column of spaced apart ridges is provided on the bottom with adjacent ridges defining an area to receive and position media.

Of course it is to be understood that the multi-media tray of the invention can be used to store and organize any number and type of media and their respective cases, or containers, but for ease of reference the specification and appended claims will refer to 3½ inch and 5¼ inch computer diskettes.

BRIEF DESCRIPTION OF THE DRAWINGS

FIG. 1 is a front perspective view of one embodiment of a tray of the present invention having a cover in the closed position.

FIG. 2 is a cross sectional view along line 2—2 of the tray of FIG. 1 showing several partitions provided in the bottom.

FIG. 3 is a perspective view the most preferred partition member useful in the present invention.

DETAILED DESCRIPTION OF THE INVENTION AND PREFERRED EMBODIMENTS

Figure 4:
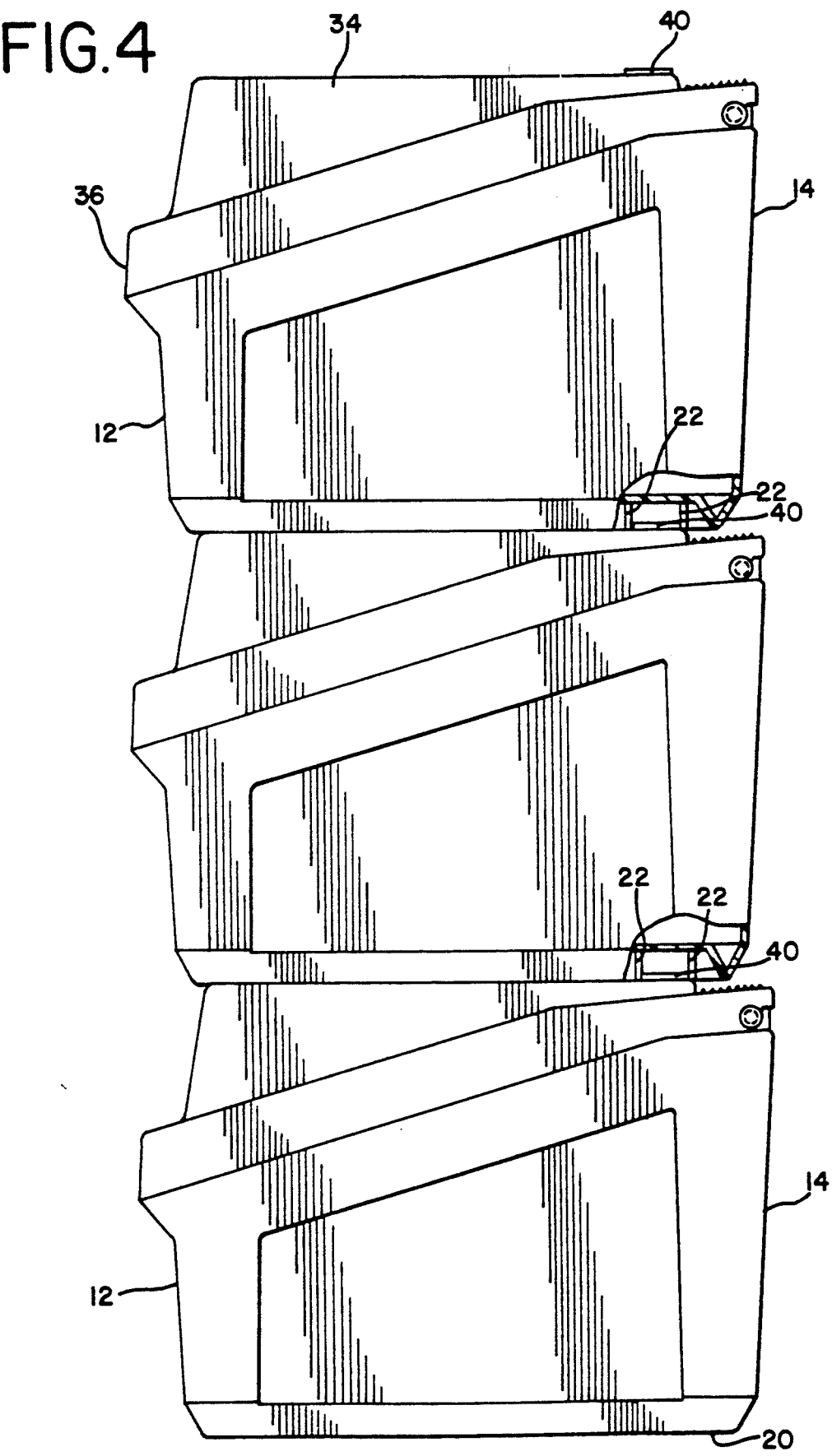
FIG. 4 is a side view of several trays of FIG. 1 vertically stacked with a portion of two trays cut away to show how the upright member provided on the cover positively mates with the downstanding member on the underside of the bottom.

FIG. 1 illustrates one embodiment of the invention wherein a multi-media tray 10 is provided with a cover 30 shown in a closed position. Each tray 10 has a bottom 20 (not seen) and four upwardly extending walls including a front wall 12, a rear wall 14 (not seen) spaced from and substantially parallel to the front wall, a first side wall 16 at a substantially right angle to the front wall, and a second side wall 18 (not seen) spaced from and substantially parallel to the first side wall 16. Preferably, the tray 10 is molded from plastic. More preferably the tray 10 is integrally molded as one piece from plastic.

Each of the walls can have any suitable vertical height. Of course, each of the walls may have substantially the same vertical height. Preferably, the walls have a vertical height to substantially position and secure media such as 5¼ inch diskettes placed within the tray 10. In a preferred embodiment, the vertical height of the rear wall 14 is greater than the vertical height of the front wall 12 so that the vertical height of each side wall 16 and 18 is greater near the rear of the tray than near the front of the tray.

The cover 30 is connected to the rear wall 14 of the tray, preferably by a hinge. The hinge may comprise more than one piece, for example, two pieces, wherein a first portion of the hinge is molded with the cover and a second portion is molded with the tray 10. Alternatively, the hinge may be made as one piece from plastic so that the entire tray 10, including the cover 30 can be integrally molded from plastic. In this embodiment, the hinge may be a plastic living hinge.

The cover 30 may also have a clasp 38 located on its front 36 to cooperate with the front wall 12 of the tray so secure the cover 30 from opening. In addition, the cover 30 may be provided with a locking means such as a snap-in key lock that can be integrally molded with the cover. Of course, other means of locking can be provided.

The cover 30 preferably has a window 34 provided along its top surface 32 and front 36 so that the contents of the tray 10 can be viewed. Preferably, the window 34 can be snapped into the cover 30 and is clear so that the media and any writing provided on the media can best be viewed.

It is sometimes desirable to be able to vertically stack each tray 10 as best seen in FIG. 4. Accordingly, the top surface of the cover 32 is preferably substantially horizontal. To secure the stacked trays from movement relative to each other, the top surface 32 is preferably provided with an upright member 40 to positively mate with a downstanding member 22 provided on the underside of the bottom 20. The upright member 40 may be a nub, protrusion, protuberance, lip, or the like. Alternatively, the upright member 40 may be a ridge located on the top of the cover and extending substantially the entire width (from one side of the cover to the other side) of the cover 30.

The downstanding member 22 is such that it will positively mate with the upright member 40 to secure the stacked trays from movement with respect to each other. Of course, the downstanding member may have any suitable shape complementary with the upright member. For example, where the upright member 40 is an extending ridge, the downstanding member 22 can be a pair of spaced apart depending walls parallel to the rear wall 14 of the tray and extending substantially from one side wall 16 to the other side wall 18. In this way, when the downstanding member 22 positively mates with the upright member 40, the vertically stacked trays are substantially secured from movement with respect to each other.

Figure 5:
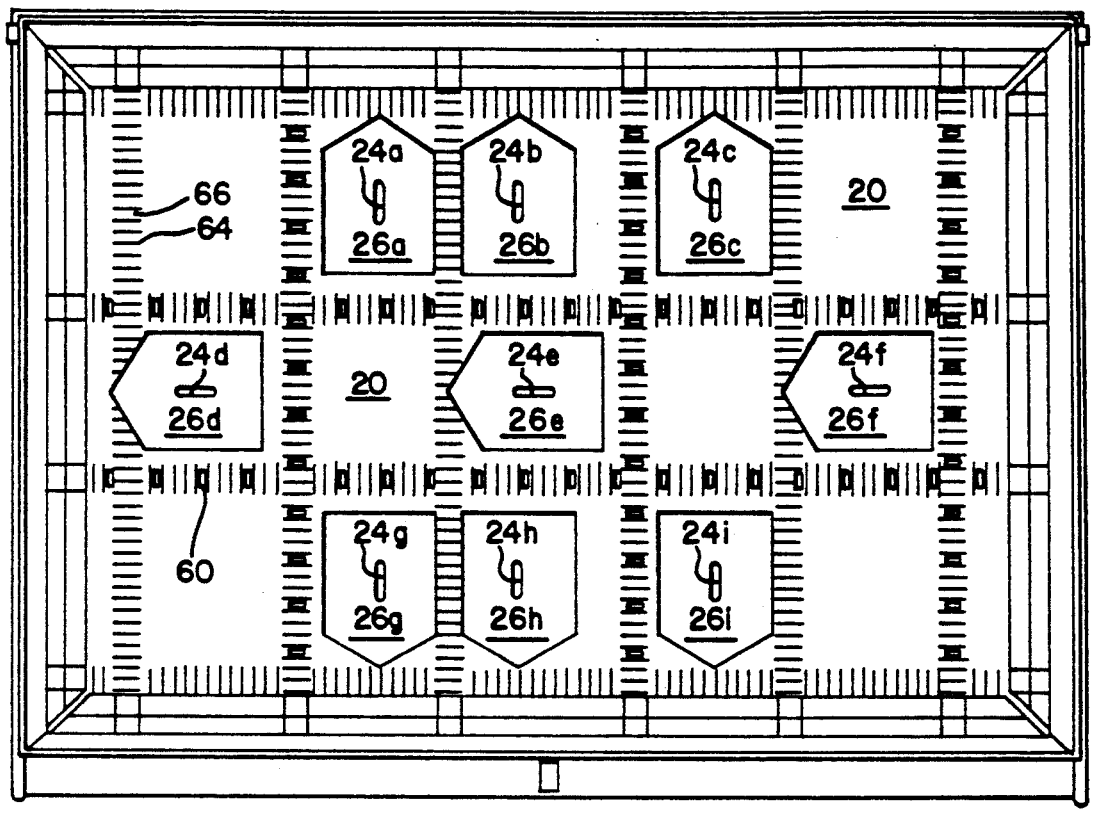
FIG. 5 is a top view of the most preferred embodiment of the bottom of the tray of the present invention showing the location of the positioning slots, detents, index slots, and ridges.
Figure 6:
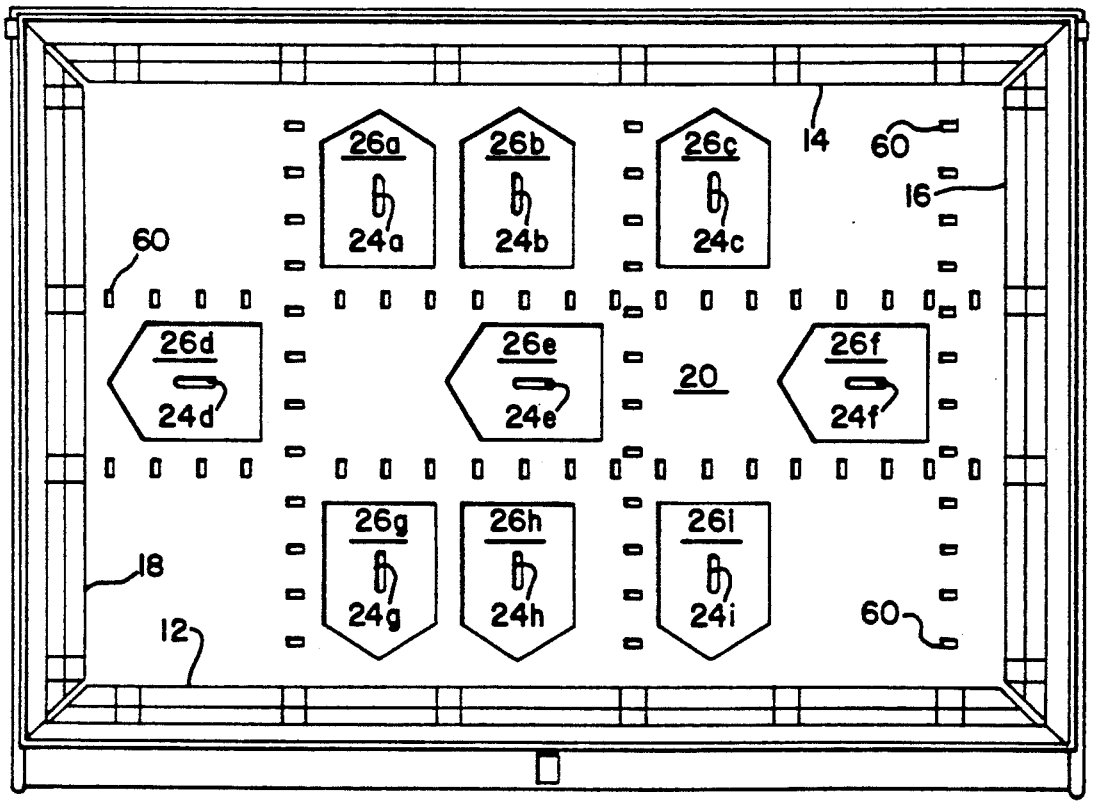
FIG. 6 is a top view of one embodiment of the bottom of the tray showing the most preferred location of the positioning slots, detents, and index slots.

As best seen in FIGS. 1 and 5, the length of the front wall 12 and of the rear wall 14 is substantially the same and can be any length according to, among other things, manufacturing and consumer preferences. Preferably, the front wall 12 and the rear wall 14 have length so that the tray 10 can accommodate a column of 5¼ inch diskettes or two columns of 3½ inch diskettes placed side-by-side. Most preferably, the front wall 12 and rear wall 14 are long enough so that the tray 10 can accommodate three columns of 3½ inch disks placed side-by-side or two columns of 5¼ inch diskettes placed side-by-side. Of course, if a cover 30 is provided, the length of the cover 30 will be substantially the same as the length of the tray front wall 12 and the tray rear wall 14. The length of the first of the second side walls is substantially the same and may be any suitable length according to, among other things, manufacturing or consumer preferences.

In the most preferred embodiment of the invention, as best seen in FIG. 5, the bottom 20 of the tray 10 is provided with a plurality of positioning slots 24 with a detent 26 surrounding each slot 24. The positioning slots 24 are strategically located to removably engage partition members 50 as will become clear later. When the length of the front wall 12 is such that the tray 10 can accommodate two columns of 5¼ inch diskettes placed side-by-side, at least six slots 24 are preferably provided, with a first row of three slots 24 located near the rear wall 14 and a second row of three slots 24 located near the front wall 12. Each row lies in a plane substantially parallel to the plane of the front wall 12. The slots 24 in the second row preferably lie in the same plane as the slots in the first row which is substantially parallel to the plane of the first side wall 16. The desirability of providing three slots in each row will become clear. Of course, less than three slots in each row can be provided. Alternatively, if the length of the front wall 12 of the tray 10 is such that the tray can accommodate more than two 5¼ inch diskettes placed side-by-side, more than three slots 24 in each of the first and second rows are preferred.

Most preferably, nine slots 24a, 24b, 24c, 24d, 24e, 24f, 24g, 24h, 24i are provided with a first row of three slots 24a, 24b, 24c located near the rear wall 14, a second row of three slots 24g, 24h, 24i located near the front wall 12, and a third row of three slots 24d, 24e, 24f located along the approximate center longitudinal line of the bottom between the first row and the second row of slots. Again, each row lies in a plane parallel to the plane of the front wall with the slots in second row preferably lying in the same plane as the slots in the first row (i.e. 24a and 24g lie in the same plane which is parallel to the plane of the side wall 16).

The most preferred embodiment of a partition member 50 useful in the present invention is shown in FIG. 3. The partition member 50 has a substantially flat top surface 52 that is pentagonally shaped with a rear end having two right angles and a front end being shaped as an outwardly pointing triangle. Preferably, the partition 50 has a longitudinal wall 54 extending substantially vertically upward from the top surface 52 of the partition with the wall 54 extending along the approximate center longitudinal line. The longitudinal wall 54 may have any suitable height up to the height of the wall of the tray 10 having the smallest vertical height and may be dictated by, among other things, manufacturing and aesthetic considerations. Preferably, the height of the wall 54 is sufficient to provide support to media located within the tray 10. Most preferably, the height of the wall 54 is at least about one inch.

The wall 54 may extend longitudinally only a portion of the partition. Preferably, the wall 54 extends at least the entire length of the partition 50. Most preferably, the wall 54 extends beyond the ends of the partition with the length of the wall 54 extending beyond the rear end being greater than the length of the wall extending beyond the front end. Alternatively, if desired, the wall 54 may extend beyond the ends of the partition with the length of the wall 54 extending beyond the front end being greater than the length of the wall extending beyond the rear end.

A depending tab 56 is preferably provided on the underside of the partition 50 to removably engage a positioning slot 24 and secure the partition 50 from movement.

As noted above, a detent 26 having substantially the same shape as the uni-directional partition member 50 surrounds each positioning slot 24. Of course, the detent 26 in the most preferred embodiment will also be pentagonally shaped. It is clear then that because the shape of the detent 26 and the partition 50 are substantially the same and of a specific pentagonal shape, the partition 50 will fit in the detent 26 only when the partition 50 is oriented in a single specific direction. With the front end of the partition 50 shaped as an outwardly pointing triangle, the placement of the partition member 50 in the bottom 20 of the tray 10 is simplified.

When the length of the front wall 12 is such that the tray 10 can accommodate two columns of 5¼ inch diskettes placed side-by-side, at least six detents 26 are preferably provided, with a first row of three detents 26 located near the rear wall 14 and a second row of three detents 26 located near the front wall 12. Each row lies in a plane substantially parallel to the plane of the front wall 12. The detents 26 in the second row preferably lie in the same plane as the detents 26 in the first row which is substantially parallel to the side wall 16. The desirability of providing three detents in each row will become clear. Of course, less than three detents in each row can be provided. Alternatively, if the length of the front wall 12 of the tray 10 is such that the tray can accommodate more than two 5¼ inch diskettes placed side-by-side, more than three detents 26 in each of the first and second rows are preferred.

Most preferably, nine detents 26a, 26b, 26c, 26d, 26e, 26f, 26g, 26h, 26i are provided with a first row of three detents 26a, 26b, 26c located near the rear wall 14, a second row of three detents 26g, 26h, 26i located near the front wall 12, and a third row of three detents 26d, 26e, 26f located along the approximate center longitudinal line of the bottom between the first row and the second row of detents. Again, each row lies in a plane parallel to the plane of the front wall 12 with the detents 26 in second row preferably lying in the same plane as the detents 26 in the first row (i.e. 26a and 26g lie in the same plane parallel to the side wall 16).

Figure 7:
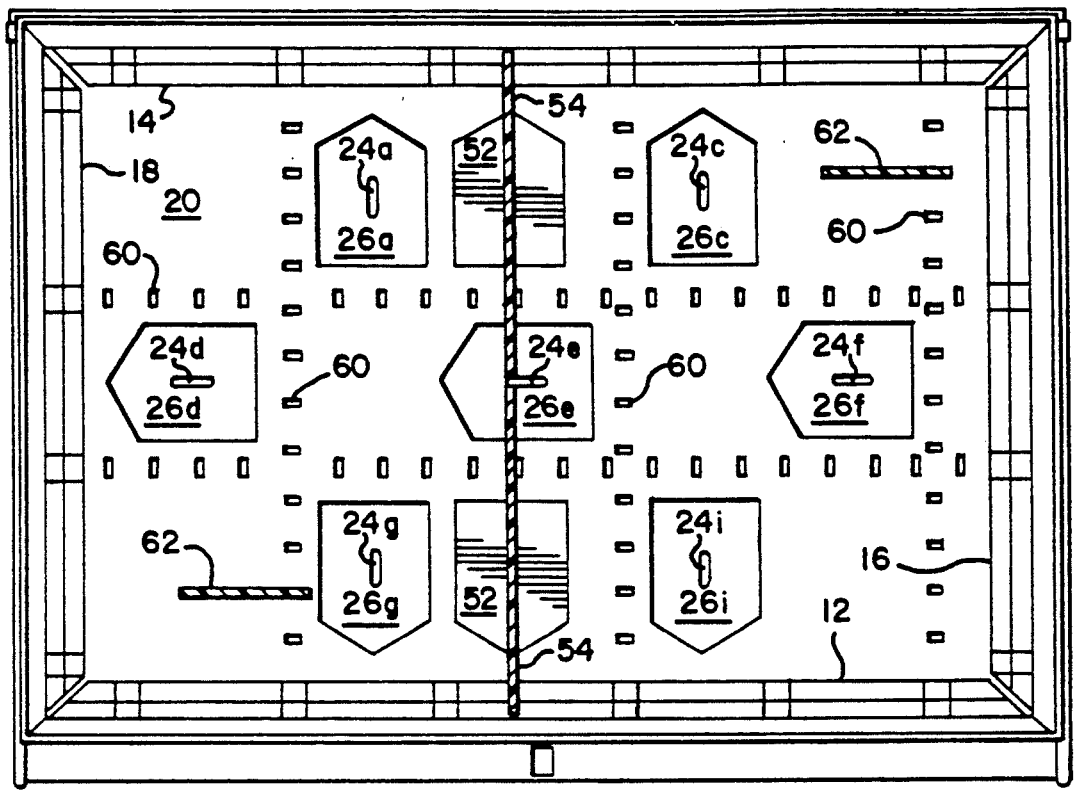
FIG. 7 is a top view of one embodiment of the bottom of the tray with the partition members of FIG. 3 provided in one location useful for storing all 5¼ inch computer diskettes and like media.

As best seen in FIG. 7, the detents 26 and thus the partitions 50 have a length less than the width and length of the bottom 20 which of course is determined by the length of the side walls 16 and 18 and the front 12 and rear 14 walls, respectively. In the most preferred embodiment, a detent 26, a partition 50, and a longitudinal wall 54 on the partition 50 are provided in the first and the second row so that the longitudinal walls 54 of the partitions 50 extend substantially from the front wall 12 to the rear wall 14 when the partitions 50 are located in corresponding detents 26 (e.g., 26a and 26g).

As noted above, three detents 26d, 26e, 26f and partitions 50 are provided in the third row so that the longitudinal walls 54 of the partitions 50 extend from one side wall to the other when the partitions 50 are located in the detents 26. In this way, each of the partitions 50 useful in the first and second row are identical to the partitions 50 useful in the third row. Alternatively, two differently sized partitions 50 may be provided. For example, one size may be provided for the first and second rows and a different size may be provided for the third row. In this case, the detents 26 and partitions 50 for the first and second rows may be as described above. A single detent and partition may be provided in the third row instead of the above described three partitions. Alternatively, the length of the detent and thus the partition provided for the third row may be about one-half the length of the front wall 12 so that two detents and partitions are provided.

In another embodiment, a single detent and partition may be provided in the first and second rows instead of the corresponding detents in the first and second rows. In this embodiment, three detents parallel to the first side wall and having a length up to the width of the bottom (the length of the side wall) would be provided. It would be preferred in this embodiment that three detents be provided in the third row as described above.

Placement of the partition members 50 in the most preferred embodiment will now be described. Where the user wishes to store and organize only 5¼ inch diskettes and like media, one partition member 50 is placed in the detent 26b and another partition member is placed in detent 26h. It is clear that because of the shape of the detent 26 and of the partition 50, the front end of the partition member 50 placed in the detent 26b points toward the rear wall 14 and that the front end of the partition member 50 placed in detent 26h points toward the front wall 12. It is also clear that each of the partition members 50 will fit into the detent 26 when they are oriented in only one specific direction. The tab 56 provided on the underside of the partition 50 removably engages the positioning slot 24 to secure the partition 50 from movement.

As noted above, the longitudinal wall 54 most preferably extends beyond each end of the partition 50, with the wall 54 extending beyond the rear end an amount greater than the front end. By specifically locating the positioning slots 24 and thereby the detents 26, and by providing the longitudinal wall 54 in the described fashion, the longitudinal wall 54 extending beyond the rear end of the partition 50 located within detent 26b substantially adjoins the longitudinal wall 54 extending beyond the rear end of the partition 50 within the detent 26h. In this way, a substantially continuous wall is provided from the front wall 12 of the tray to the rear wall 14.

A column of 5¼ inch diskettes may be placed adjacent the first side wall 16 of the tray with another column of 5¼ inch diskettes placed adjacent the second side wall 18 with the substantially continuous wall provided by the longitudinal wall of the partitions separating the columns of diskettes and also providing lateral support to the media.

When it is desired to store only 3½ inch diskettes and like media, partitions 50 may be placed in detents 26a, 26c, 26g and 26i. In this way, the tray 10 is divided into three sections so that three columns of 3½ inch diskettes may be stored. Alternatively, partitions 50 may be placed into detents 26d, 26e, and 26f to divide the tray 10 into two sections; a front half and a rear half. In this way, two rows of 3½ inch diskettes may be stored.

When it is desired to store a combination of media, for example, 3½ inch diskettes and 5¼ inch diskettes, partitions 50 may be placed in detents 26b, 26d, 26e, and 26f. In this way, two columns of 5¼ inch diskettes can be stored at the rear of the tray 10 with one row of 3½ inch diskettes or several data cartridges stored at the front of the tray 10. Likewise, partitions 50 may be placed in detents 26d, 26e, 26f, and 26h so that two columns of 5¼ inch diskettes can be stored at the front of the tray 10 with one row of 3½ inch diskettes or several data cartridges stored at the rear of the tray 10.

Alternatively, partitions 50 may be placed in detents 26b, 26g, and 26i to store three columns of 3½ inch diskettes in the front half of the tray 10 with two columns of 5¼ inch diskettes in the rear half of the tray 10. In this arrangement, it may also be desirable to provide partitions 50 in the detents 26d, 26e, and 26f to provide a wall to support and separate the 3½ inch diskettes from the 5¼ inch diskettes.

Of course, there may be other ways of arranging the partitions which may be useful to the user.

In an alternative embodiment of the present invention, the bottom 20 is provided with a plurality of positioning slots 24 adapted to removably engage partition members. The positioning slots 24 are preferably located in the same position as described above for the most preferred embodiment. Thus, when the tray 10 is sized to accommodate two 5¼ inch diskettes placed side-by-side, it is preferred that at least six positioning slots 24 be provided with a first row of three slots located near the rear wall 14 of the tray and second row of three slots located near the front wall 12 of the tray. Each of the slots 24 in the first row lie in the same plane as each of the slots in the second row. In this embodiment, the partition member preferably comprises a substantially vertical member having a depending tab or leg that removably engages the positioning slot. Preferably, the vertical member has a height and length several times greater than its width. Most preferably, the vertical member is substantially rectangular.

In this embodiment, the tab is located closer to one end of the partition than the other end. By locating the tab in this fashion, the partition member will fit in the tray 10 in only a single specific direction because of the location of the positioning slots and the tab. For example, considering a slot 24 located in the second row, the tab of the partition member can only engage the positioning slot 24 when the partition member is oriented in a single specific direction because of the location of the slot 24 with respect to the front wall 12 of the tray. Because the tab is located closer to one end of the partition member the "shorter end" of the partition will substantially adjoin the front wall. Of course, if the user rotated the partition 180° and attempted to engage the slot, the "longer end" of the partition would prevent the user from being able to engage the tab with the positioning slot.

When the length of the front wall 12 is such that the tray 10 can accommodate two 5¼ inch diskettes placed side-by-side, at least six positioning slots are preferably provided. In this case, a first row of three slots located near the rear wall 14 and a second row of three slots located near the front wall 12 are provided. Each row lies in a plane substantially parallel to the plane of the front wall 12. The slots in the second row preferably lie in the same plane as the slots in the first row. Of course, less than three slots in each row can be provided. Alternatively, if the length of the front wall 12 is such that the tray can accommodate more than two 5¼ inch diskettes placed side-by-side, more than three slots in each of the first and second row are preferred.

More preferably, nine slots are provided with a first row of three slots located near the rear wall 14, a second row of three slots located near the front wall 12, and a third row of three slots located along the approximate center longitudinal line of the bottom between the first row and the second row of slots. Again, each row lies in a plane parallel to the plane of the front wall with the slots in second row preferably lying in the same plane as the slots in the first row.

The partition will preferably have a length less than the width of the tray 10. More preferably, the partition will have a length such that when a partition is engaged in a slot 24 in the first row and a partition is engaged in a corresponding slot in the second row, the partitions will lie in substantially the same plane so that like ends substantially adjoin to form a substantially continuous partition from the front wall to the rear wall. Alternatively, a single partition may be provided having a length substantially equal to the width of the bottom.

When nine slots are provided, it is preferred that the partitions be identical so that three partitions would be located in the three slots in the third row to provide a substantially continuous wall from the first side wall 16 to the second side wall 18. Alternatively, a single partition may be provided having a length substantially equal to the width of the bottom. In this case, it is preferred that three partitions be provided for the third row. In another embodiment, a single partition may be provided in the third row and preferably two partitions would be provided for the corresponding slots in the first and second rows.

In another embodiment, the bottom 20 is provided with a plurality of detents. In this embodiment positioning slots 24 are not provided. When the tray 10 is sized to accommodate two 5¼ inch diskettes side-by-side, the detents are preferably located and have a depth as described in the most preferred embodiment. In this particular embodiment, each detent preferably has a pentagonal shape adapted to receive the partition of the most preferred embodiment. Of course, the partition in this case will not have a depending tab provided on its underside.

Alternatively, the detent may have any other desirable length and shape, including rectangular. For example, instead of providing a first row and a second row of detents, detents may be provided that are parallel with the side wall and extend substantially the width of tray 10. In this way a substantially continuous partition is provided from the front wall to the rear wall. In this embodiment, it is preferred that the detents as described above for the third row be provided.

Likewise, a single detent may be provided in place of the three detents in the third row. In this case, it is preferred that the detents as described above for the first and second row be provided.

With reference to the most preferred embodiment, the bottom 20 further has at least one column of spaced apart index slots 60, each adapted to receive an index divider 62. The index dividers 62 may have any suitable size and shape to divide and identify media placed within the tray 10. In addition, the dividers 62 may contain writing or be adapted to receive labels and the like to identify media placed adjacent to the index divider 62.

Preferably, at least one column of index slots 60 is parallel to the first side wall 16 and one column is parallel to the front wall 12. More preferably, three columns of spaced apart index slots 60 are provided parallel to the first side wall 16 with a first column adjacent to the first side wall 16. The second column is spaced from the first column and the third column is spaced from the second column a distance substantially equal to the distance between the first and second column. In this way, index dividers are located such that, when three columns of 3½ inch diskettes are provided in the tray of the most preferred embodiment, at least one index divider can be provided for each column of diskettes. At the same time, when the tray of the most preferred embodiment is configured to receive two columns of 5¼ inch diskettes, at least one index divider can be provided for each column of diskettes.

Alternatively, three columns of spaced apart index slots 60 can be provided parallel to the first side wall 16 with a first column adjacent to the second side wall 18. The second column is spaced from the first column and the third column is spaced from the second column a distance substantially equal to the distance between the first and second column.

In addition, two columns of index slots 60 are most preferably provided parallel to the front wall 12 and located on either side of the approximate center transverse line of the bottom 20. In this way, when the tray 10 of the most preferred embodiment is configured to store two rows of 3½ inch diskettes at least one index divider can be provided for each column of diskettes.

The bottom 20 most preferably is also provided with at least one column of spaced apart ridges 64 with adjacent ridges defining an area 66 to receive and position media. Each of the ridges 64 may have any suitable height to position 3½ inch diskettes and 5¼ inch diskettes, as well as other media.

Figure 8:
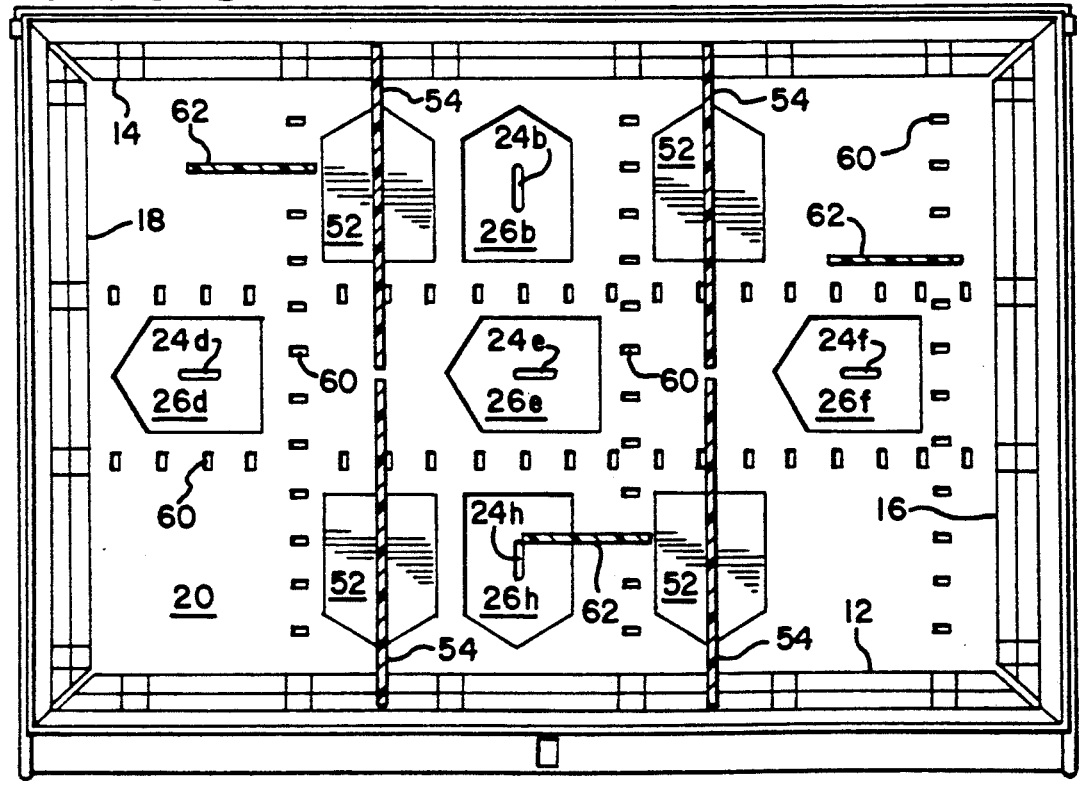
FIG. 8 is a top view of one embodiment of the bottom of the tray with the partition members of FIG. 3 provided in one location useful for storing all 3½ inch computer diskettes and like media.
Figure 9:
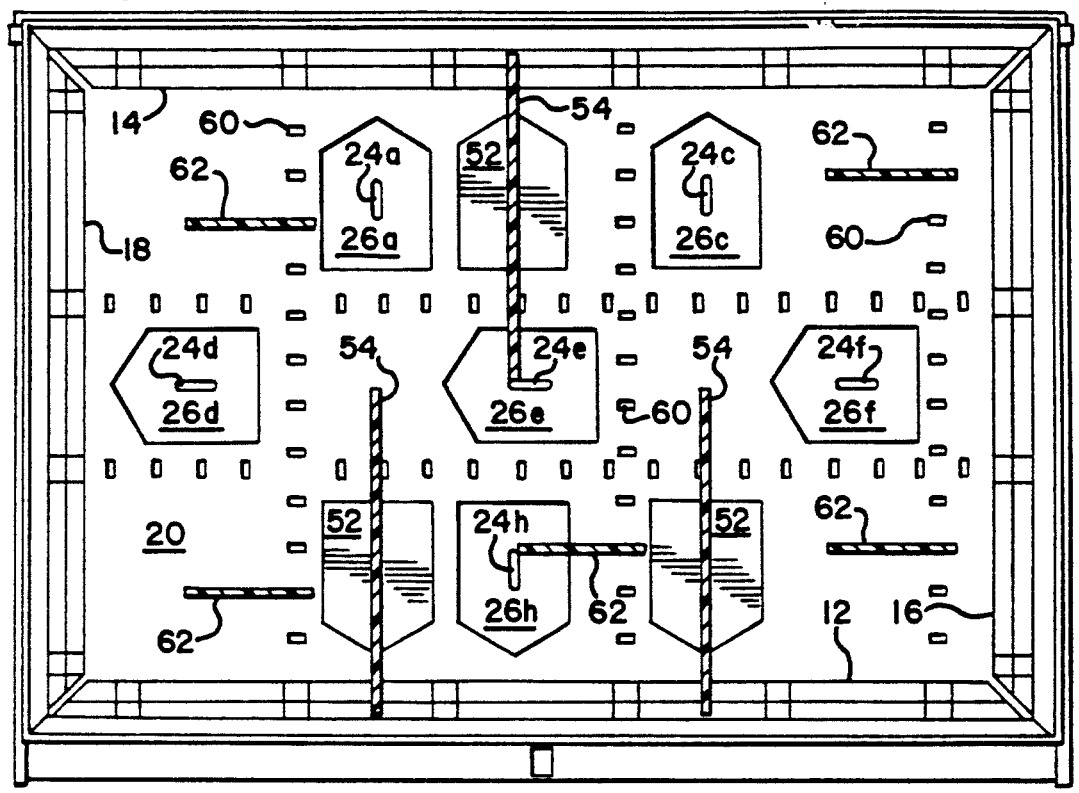
FIG. 9 is a top view of one embodiment of the bottom of the tray with the partition members of FIG. 3 provided in one location useful for storing a combination of 5¼ inch computer diskettes and 3½ inch computer diskettes and like media where the 3½ inch diskettes are stored in the front half of the tray and the 5¼ inch diskettes are stored in the rear half of the tray.
Figure 10:
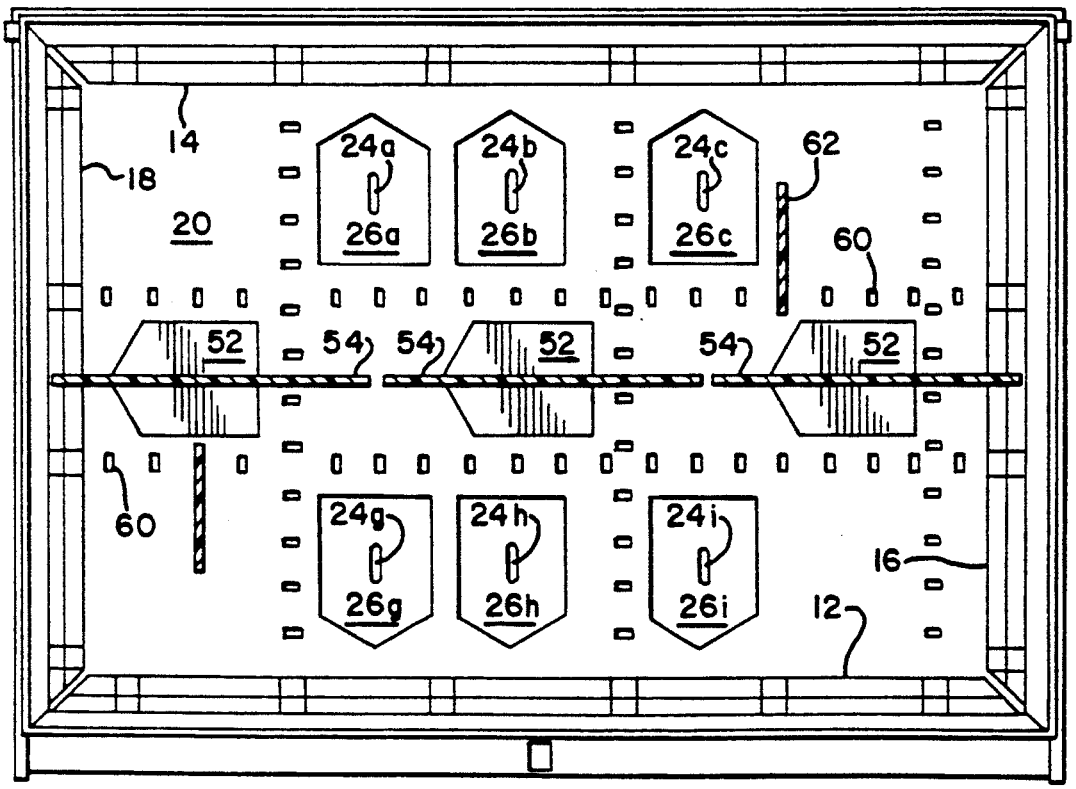
FIG. 10 is a top view of one embodiment of the bottom of the tray with the partition members of FIG. 3 provided in one location useful for storing data cartridges and the like and for storing 3½ inch diskettes in two columns parallel to the front wall.

Preferably, one column of ridges 64 is provided parallel to the first side wall 16 and one column is provided parallel to the front wall 12. More preferably, six substantially equally spaced columns of ridges 64 are provided parallel to the first side wall 16. In this case, when the tray 10 is divided from front to rear to accommodate three columns of 3½ inch diskettes (FIG. 8), the diskettes will be positioned by two adjacent columns of ridges 64.

Four columns of ridges 64 are preferably provided parallel to the front wall 12. In this case, when the tray 10 is divided from side to side to accommodate two rows of 3½ inch diskettes, the diskettes will be positioned by two adjacent columns of ridges 64.

The columns of index slots and the columns of ridges lie in the same plane with at least some of the index slots located in the area between adjacent ridges. Alternatively, at least some of the index slots may supplant some of the ridges.

In another embodiment, the front wall 12 has a lip that extends outwardly from the top or uppermost part of the front wall 12 as shown in FIG. 2. An interlocking means can be provided on the front of the cover 36 at any suitable location to engage the lip such that the tray 10 can be maintained in a closed condition. Of course, any means for locking with or without a key can be used.

Of course it should be understood that a wide range of changes and modifications can be made to the embodiments described above. It is therefore intended that the foregoing description illustrates rather than limits this invention, and that it is the following claims, including all equivalents, which define this invention.

I claim:

1. A multi-media tray comprising:
   a. a bottom with four upwardly extending walls including a front wall, a rear wall spaced from and substantially parallel to the front wall, a first side wall at a substantially right angle to the front wall, and a second side wall spaced from and substantially parallel to the first side wall;
   b. a plurality of partition member positioning slots provided on the bottom with each positioning slot surrounded by a detent; and,
   c. at least one removable uni-directional partition member comprising a substantially flat top surface with a front end and a rear end, the top surface having the same shape as the detent, a longitudinal wall extending substantially vertically upward from the top surface, and a depending tab provided on the underside of the partition member such that the detent and positioning slot removably receive the partition member and the tab, respectively, only when the front end of the partition member is oriented in a distinct direction with respect to the detent.

2. The multi-media tray of claim 1 wherein the top surface of the partition member is pentagonally shaped with a rear end having two right angles and a front end being shaped as an outwardly pointing triangle.

3. The multi-media tray of claim 1 wherein the longitudinal wall extends along at least the entire length of the top surface of the partition.

4. The multi-media tray of claim 1 wherein the wall extends along the approximate center longitudinal line of the top surface of the partition member.

5. The multi-media tray of claim 1 wherein at least one end of the longitudinal wall extends beyond an end of the top surface of the partition member.

6. The multi-media tray of claim 1 wherein both ends of the longitudinal wall extend beyond the respective ends of the top surface of the partition member with the length of the longitudinal wall extending beyond the rear end of the top surface being greater than the length of the longitudinal wall extending beyond the front end of the top surface.

7. The multi-media tray of claim 1 wherein the tab is located closer to one end of the top surface of the partition member than the other end.

8. The multi-media tray of claim 7 wherein the positioning slots comprise two rows of slots with the rows lying in a plane parallel to the front wall, the rows comprising a first row of three slots located near the rear wall and a second row of three slots located near the front wall with the slots in the second row lying in the same plane as the slots in the first row so that when one partition member removably engages a slot in the first row and another partition member removably engages a corresponding slot in the second row, like ends of the wall of the partition members substantially adjoin.

9. The multi-media tray of claim 1 wherein the positioning slots comprise three rows of slots with the rows lying in a plane parallel to the front wall, the rows comprising a first row of three slots located near the rear wall, a second row of three slots located near the front wall with the slots in the second row lying in the same plane as the slots in the first row, and a third row of three slots located along the approximate center longitudinal line of the bottom.

10. The multi-media tray of claim 1 further comprising:
    a. at least one column of spaced apart index slots extending substantially from one wall of the tray to an opposite wall and being characterized by the absence of a detent surrounding the index slot; and,
    b. at least one index divider removably engaging an index slot.

11. The multi-media tray of claim 10 wherein at least one of the columns of index slots is parallel to the first side wall and one of the columns of index slots is parallel to the front wall.

12. The multi-media tray of claim 11 wherein the bottom further has at least one column of spaced apart ridges with at least some of the index slots located in the area between adjacent ridges.

13. A multi-media tray comprising:
    a. a bottom with four upwardly extending walls including a front wall, a rear wall spaced from and substantially parallel to the front wall, a first side wall at a substantially right angle to the front wall, and a second side wall spaced from and substantially parallel to the first side wall;
    b. a plurality of partition member positioning slots provided on the bottom with each positioning slot surrounded by a detent wherein the positioning slots comprise two rows of slots lying in a plane parallel to the front wall, the rows comprising a first row of three slots located near the rear wall and a second row of three slots located near the front wall with the slots in the second row lying in the same plane as the slots in the first row; and, c. at least one removable uni-directional partition member comprising a substantially flat top surface with a front end and a rear end, the top surface having the same shape as the detent and including, a longitudinal wall extending substantially vertically upward from the top surface and along the longitudinal length of the top surface such that the length of the wall extending beyond the rear end is greater than the length of the wall extending beyond the front end and a depending tab provided on the underside of the partition member such that the detent and positioning slot removably receive the partition member and the tab, respectively, only when the front end of the partition member is oriented in a single distinct direction with respect to the detent so that when one partition removably engages a slot in the first row the front end points toward the rear wall and when another partition removably engages a corresponding slot in the second row the front end points toward the front wall and the portion of the longitudinal wall extending beyond the rear end of each partition substantially adjoin.

14. A multi-media tray comprising:

a. a bottom with four upwardly extending walls including a front wall, a rear wall spaced from and substantially parallel to the front wall, a first side wall at a substantially right angle to the front wall, and a second side wall spaced from and substantially parallel to the first side wall;

b. a plurality of partition member positioning slots provided on the bottom with each positioning slot surrounded by a detent wherein the positioning slots comprise three rows of slots lying in a plane parallel to the front wall, the rows comprising a first row of three slots located near the rear wall, a second row of three slots located near the front wall with the slots in the second row lying in the same plane as the slots in the first row, and a third row of three slots located along the approximate center longitudinal line of the bottom; and, c. at least one removable uni-directional partition member comprising a substantially flat top surface with a front end and a rear end, the top surface having the same shape as the detent and including, a longitudinal wall extending substantially vertically upward from the top surface and along the longitudinal length of the top surface such that the length of the wall extending beyond the rear end is greater than the length of the wall extending beyond the front end and a depending tab provided on the underside of the partition member such that the detent and positioning slot removably receive the partition member and the tab, respectively, only when the front end of the partition member is oriented in a single distinct direction with respect to the detent.

* * * * *